United States Patent

[11] 3,633,458

[72] Inventor Ichiji Ito
9711 Oaza Nakaminowa, Minowa,
Kamiina-gun, Nagano, Japan
[21] Appl. No. 34,840
[22] Filed May 5, 1970
[45] Patented Jan. 11, 1972
[32] Priority May 14, 1969
[33] Japan
[31] 44/36705

[54] INDEX HEAD
18 Claims, 9 Drawing Figs.

[52] U.S. Cl. ................................................. 90/56 R,
74/813 L, 408/71
[51] Int. Cl. ..................................................... B23f 23/08,
B23q 17/04, B23b 39/06

[50] Field of Search ........................................... 90/56, 57;
74/813, 813 L, 816, 817; 51/216 ND, 216 H;
408/71

[56] References Cited
UNITED STATES PATENTS
3,011,245  12/1961  Mueller ........................ 408/71 X
3,443,481   5/1969  Ramage ........................ 90/56

Primary Examiner—Gil Weidenfeld
Attorney—McGlew & Toren

ABSTRACT: An index head adapted for direct indexing operation wherein rotation of the worktable by the desired distances is attainable upon positioning a manually operable lever in the desired spot in a stepped opening bored through the housing for said index head, and setting a pneumatic drive mechanism into actuation, each time the work held on said worktable is to be turned said desired distances.

PATENTED JAN 11 1972 3,633,458

INVENTOR:
ICHIJI ITO
BY McGlew & Toren
ATTORNEYS

INVENTOR

ICHIJI ITO

BY

ATTORNEY

INDEX HEAD

This invention relates to an index head for dividing the circumference of a circle into the desired spaced parts.

An object of the present invention is to provide an index head wherein direct indexing operations may be carried out with much ease by manipulating a single operating lever.

Another object of the present invention is to provide an index head wherein a pneumatic actuating mechanism is used for actuating and stopping the worktable and the attrition of the working parts of the index head, which leads frequently to the inaccuracy in the indexing operation, may be positively avoided.

In view of these objects and other objects which will become more apparent hereinafter, the present invention will be described in detail by referring to the several accompanying drawings showing a preferred embodiment thereof.

Figure 1:
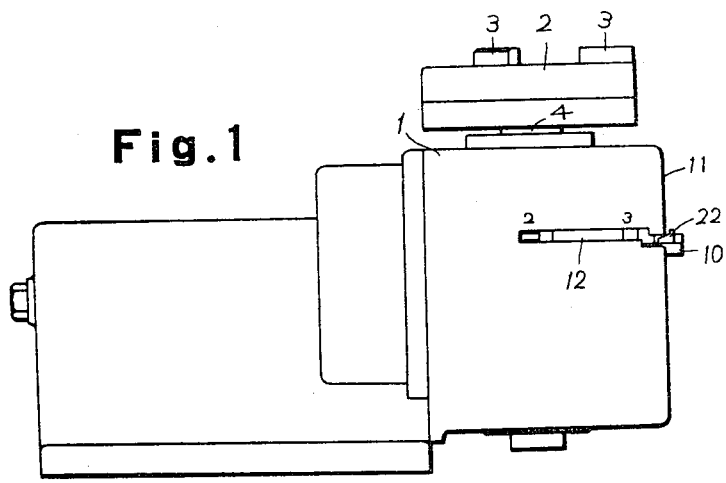
FIG. 1 is a side elevational view showing a preferred embodiment of the index head according to the present invention.
Figure 2:
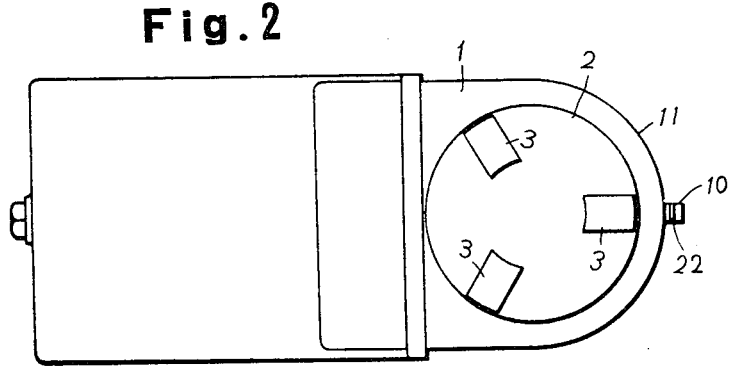
FIG. 2 is a top plan view thereof.
Figure 4:
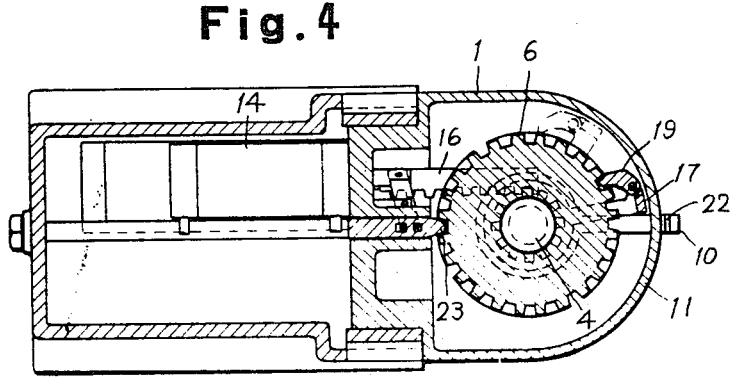
FIG. 4 is a view similar to FIG. 2 wherein the workable and the upper cover structure are detached from the index head for showing the several working parts of the index head for better understanding of the invention.
Figure 7:
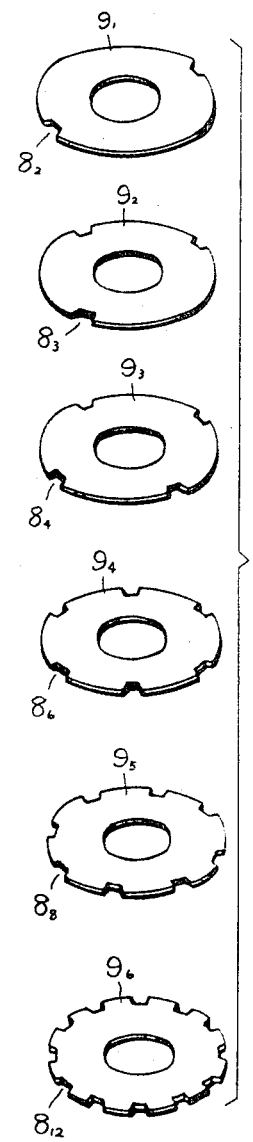
FIG. 7 is an exploded view showing a plate assembly having several dividing plates used in the index head according to the present invention.
Figure 5:
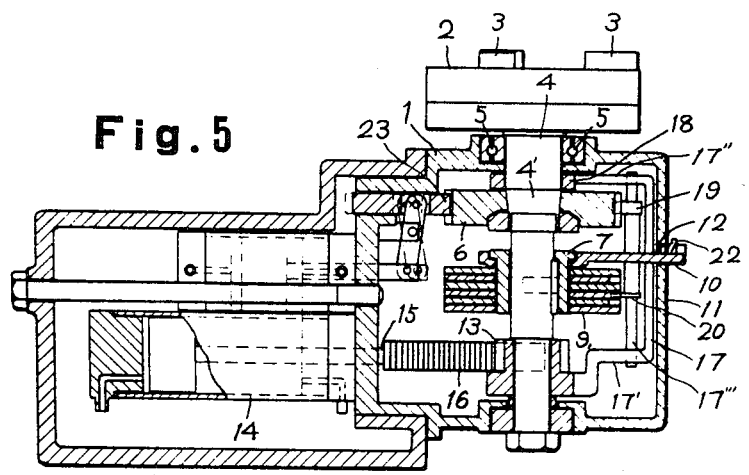
FIG. 5 is a view similar to FIG. 1 wherein the outer structure is detached from the index head for showing the several working parts of the present invention.

To the right-hand side of FIG. 1, there is shown a substantially semicylindrical housing 1 for the index mechanism. On top of the housing 1, there is mounted rotatably a worktable 2 for holding the work in position by the medium of a three-jawed chuck 3, shown only schematically in the top plan view of FIG. 2. Said worktable 2 is secured to a rotatable spindle 4 extending through the inside space of the housing 1 and carried rotatably by means of suitable bearing means 5 provided on the top wall of the housing 1. As best shown in FIGS. 4 and 5, an index gear 6 having 24 equally spaced teeth is mounted securely to the upper part of the extension 4' of the rotatable spindle 4 located in the interior space of the housing 1. A sleeve 7 is fitted about halfway on said rotatable spindle 4 for rotation therewith and for vertical displacement separately from said spindle 4 for the purpose to be set forth more in detail hereinafter. As best shown in FIG. 5, a plurality of dividing plates are arranged fixedly in superposed relation along the length of the sleeve 7. In the present embodiment, six dividing plates $9_1, 9_2, \ldots 9_6$ as shown in FIG. 7 and having respectively two, three, four, six, eight and 12 equally spaced notches are secured to said sleeve 7 so that the dividing plate $9_1$ having two equally spaced notches $8_2$ assume the lowermost position and the dividing plates $9_2, 9_3, 9_4, 9_5$ and $9_6$ having three, four, six, eight and 12 equally spaced notches $8_3, 8_4, 8_6, 8_8$ and $8_{12}$ are superposed on said dividing plate $9_1$. Such dividing plates $9_1, 9_2, \ldots 9_6$ are furthermore secured to said sleeve 7 in such a way that the respective one notch on the dividing plates $9_1, 9_2, \ldots 9_6$ may be vertically aligned with each other and with the one flute between the two consecutive teeth on the gear 6.

The numeral 10 denotes an operating lever attached at its inner end extremity to the upper peripheral flange formed on the sleeve 7 so that it can rotate freely but does not readily become loosened or detached from the latter.

The outer end extremity of the operating lever 10 is extended outwardly from said housing 1 by way of a stepped opening 12 bored through the housing wall 11. A pinion 13 is mounted on the lower peripheral part of the spindle 4 and meshes with a tooth rack 16 associated with a piston rod 15 which in turn is mounted reciprocably in a pneumatic cylinder 14 of the pneumatic actuating mechanism shown only schematically at the left-hand side of FIG. 1.

The numeral 17 denotes a substantially U-shaped piece or segment comprising a lower horizontal arm 17', an upper horizontal arm 17'' and an intermediate vertical section 17''' interconnecting said upper and lower arms. Said lower horizontal arm 17' is secured to said pinion 13 for rotation therewith and said upper arm 17'' is secured to the periphery of a bush 18 fitted loosely to said spindle 4.

Assuming that the pneumatic drive mechanism is now set into operation and the piston rod 15 is displaced in one or the other direction, said pinion 13 in mesh with the tooth rack 16 is set into rotation and the U-shaped piece 17 associated with said pinion 13 is turned therewith up to 180°, with the spindle 4 as its center, in facing relation with the inner peripheral wall of the housing 1. Such rotation of the piece 17 is brought to a stop when the latter abuts on the operating lever 10 positioned in advance at the desired area in the stepped opening 12, as will become more fully apparent as the present description proceeds.

Said intermediate vertical section 17''' of the piece 17 has an upper tongue 19 which is normally spring biased so as to be engaged with the teeth on said gear 6. When the piston rod 15 is moved in the forward direction, that is, from left to right in FIG. 1, said upper tongue 19 does not engage with the gear teeth, but glides substantially along the addendum circle of the gear 6. When the piston rod 15 is moved in the reverse direction or from right to left in FIG. 1, said upper tongue 19 will be urged into meshing with the teeth on said gear 6, under the action of an urging spring, not shown. Thus, the gear 6 is now set into rotation together with the piece 17 associated with the pinion 13. Said piece 17 is formed with a lower tongue 20 which is also normally spring biased so as to be engaged with the periphery of the dividing plates $9_1, 9_2, \ldots 9_6$. When the piston rod 15 is moved in the forward direction, that is, from left to right in FIG. 1, said lower tongue 20 glides along the circumference of the relevant dividing plate which is being used for indexing. When, however, said piston rod 15 is moved in the reverse direction, or from right to left in FIG. 1, said tongue 20 snaps readily into the notch on said dividing plate and the index gear 6 meshing simultaneously with the upper tongue 19 on the U-shaped piece 17 is turned the desired distance with rotation of the pinion 13, as will be more fully described hereinafter.

Figure 3:
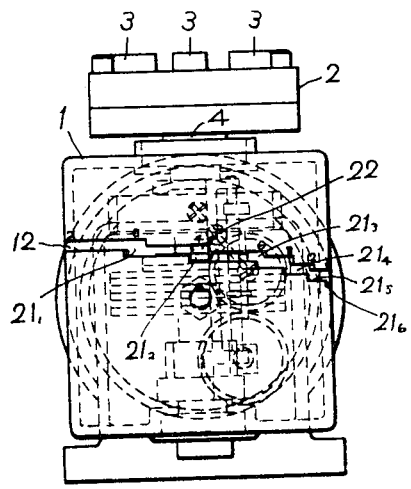
FIG. 3 is an end view thereof, showing the working parts of the index head and the annexed pneumatic actuating mechanism in imaginary lines.
Figure 6:
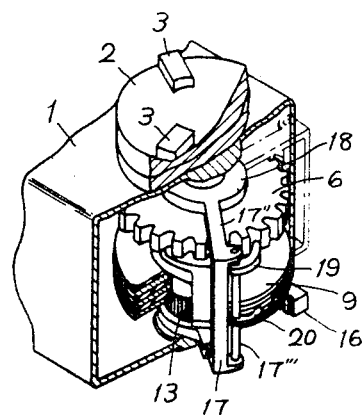
FIG. 6 is a perspective view of the index head, with part of the housing being broken away.

The stepped opening 12 is provided substantially horizontally on the peripheral part of the housing wall 11 such that the lower tongue 20 on the U-shaped piece 17 is kept at the same elevations as the dividing plates $9_1, 9_2, \ldots 9_6$, respectively, and engages with one of the notches on said dividing plates, in case the piston rod 15 has been receded to the furthest point in the pneumatic cylinder 14 and the operating lever 10 is positioned respectively at the left-hand end corners of the opening 12, the first stepped part $21_1$, the second stepped part $21_2$, the third stepped part $21_3$, the fourth stepped part $21_4$ and the fifth stepped part $21_5$, when seen in the end view of FIG. 3. More specifically, referring to FIG. 3, said stepped opening 12 comprises six stepped parts $21_1, 21_2, \ldots 21_6$ bored in a semicircle along the housing wall 11 at the sequentially decreasing elevations as seen from left to right in FIG. 3. Thus, when the lever 10 is positioned at the left-hand end corner of the opening 12 in FIG. 3, said sleeve 7 is also elevated to its uppermost position in which the lower tongue 20 faces the peripheral part of the lowermost dividing plate $9_1$ having two equally spaced notches $8_2$ and snaps into one of said notches, when the piston rod 15 has been receded to the furthest point in the cylinder 14. On the other hand, when the lever 10 is positioned at the left-hand end corners of the stepped parts $21_1$, $21_2$, ..... $21_5$, in FIG. 3, said sleeve 7 is lowered correspondingly, so that the lower tongue 20 faces the peripheral parts of the upper dividing plates $9_2$, $9_3$, ..... $9_6$ respectively and engages with the notches on said dividing plates, when the piston rod 15 has been receded to the furthest point in the cylinder 14. As the notches on the dividing plates $9_1$, $9_2$, ..... $9_6$ register vertically with the 24 teeth on the gear 6, the upper tongue 19 engages with the gear teeth whenever the lower tongue 20 snaps into the notches on the dividing plates $9_1$, $9_2$, ..... $9_6$. When the operating lever 10 is positioned manually on the bottom of the extreme right-hand side part $21_6$ in FIG. 3, the U-shaped piece 17 will be elevated to the unoperative position in which the lower tongue 20 on said piece 17 no longer engages with any of the dividing plates.

It is to be noted that the relative operative positions of the component parts of the index mechanism should be adjusted at the time of the manufacture so that, when the piston rod 15 has been receded to the furthest point in the cylinder 14 and the operating lever 10 is positioned at the left-hand end corner of the opening 12 in FIG. 3, the dividing plates $9_1$, $9_2$, ..... $9_6$ are turned clockwise as a whole to a position in which the notch $8_2$ on the dividing plate $9_1$ aligned with the notches on the remaining dividing plates is offset slightly towards the left in the top plan view of FIG. 4 from an imaginary vertical line passing through the center of the spindle 4 when seen in FIG. 4, and the lower tongue 20 on the U-shaped piece 17 snaps into the notch $8_2$ offset from said imaginary vertical line. The left-hand end corner of the stepped opening 12, when seen in the end view of FIG. 3, is located on said imaginary line, while the left-hand side end corners of the respective stepped parts $21_1$, $21_2$, ..... $21_6$ in FIG. 3 are offset to the right of the above-mentioned imaginary line by 120°, 90°, 60°, 45°, 30° and 15°, respectively.

Figure 8A:
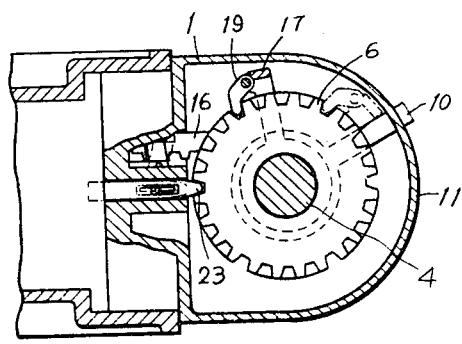
FIG. 8a is an explanatory view showing the indexing operation for dividing the circumference of a circle into six equal parts.
Figure 8B:
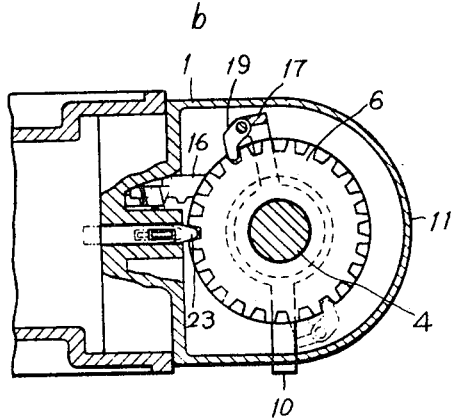
FIG. 8b is a view similar to FIG. 8a showing the indexing operation for dividing the circumference of a circle into two equal parts.

It will be apparent from the foregoing that when the U-shaped piece 17 is turned clockwise from its starting position, upon actuation of the pneumatic drive mechanism, and abuts on the operating lever 10, the lower tongue 20 on the piece 17 has turned a certain distance from its starting position, as shown in FIGS. 8a and 8b, depending upon the operative positions assumed by the operating lever 10, and now engages with a notch on the relevant dividing plate next to that aligned axially with the notches on the remaining dividing plates.

The index head of the present invention operates as follows: When machining a blank to a hexagonal shape, it is held by a suitable chuck such as a three-jawed chuck 3 on the worktable 2. With the blank held securely on the worktable 2, the operating lever 10 is moved manually and positioned at the left-hand end corner of the stepped part $21_3$ in FIG. 3. The dividing plates $9_1$, $9_2$, ..... $9_6$ are lowered as a whole and the lower tongue 20 on the U-shaped piece 17 snaps into a notch $8_6$ on the fourth lower dividing plate $9_4$ axially aligned with the notches on the remaining dividing plates, at the same time that the upper tongue 19 is brought into meshing with the tooth on the gear 6 aligned with said notch $8_6$.

When the pneumatic drive mechanism is set into operation so as to cause the piston rod 15 to move from left to right in FIGS. 4 and 5, the pinion 13 and the U-shaped piece 17 are turned clockwise with the spindle 4 as its center. With rotation of the U-shaped piece 17, the upper tongue 19 and the lower tongue 20 will slide in the same sense in frictional contact with the periphery of the gear 6 and the dividing plate $9_4$, respectively, but the gear 6 is kept in the stationary position.

When the piece 17 has turned by one-sixth of a full revolution and abuts on the operating lever 10, it is held against rotation and the lower tongue 20 on the latter snaps into a second notch $8_6$ on the dividing plate $9_4$ next to the above-mentioned notch $8_6$. At the same time, the upper tongue 20 on the U-shaped piece 17 snaps into the tooth on the gear 6 aligned with said second notch $8_6$.

When the piston rod 15 starts to be receded, the upper tongue 19 on the piece 17 engaging with the gear 6 causes the latter to rotate counterclockwise.

As will be apparent from the foregoing, the reciprocating motion of the piston rod 15 is transformed into the rotary motion of the pinion 13 engaging the rack 16 and that of the U-shaped piece 17 associated with the pinion 13, , so as to cause the piece 17 to turn desired distances and abut on the operating lever 10. In the present embodiment, said piece 17 is turned by one-sixth of a full revolution, until the same abuts on the operating rod 10 and held from further rotation. Thus, the gear 6 meshing with the upper tongue 19 on the piece 17 and hence the worktable 2 are caused to turn one-sixth of a full revolution at each reciprocating cycle of the piston rod 15.

The numerical figures 2, 3, 4, 6, 8, 12 and 24 in FIG. 3 represent the numbers of division and may be used with advantage when the operating lever 10 is being positioned in the stepped opening 12 in advance of the indexing operation.

When the operating lever 10 is positioned in the stepped opening 12, it is necessary to provide means for preventing the lever 10 from moving about in the opening 12 and mar the work held on the worktable 2. For this purpose, a spring-biased wedge piece 22 is fitted to the outer end of the operating lever 10. When the operating lever 10 is positioned at the desired area in the opening 12 and released from the manual pressure, said wedge piece 22 is urged into pressure engagement with the wall of the opening 12 and the outer extreme part of the lever 10, so that the latter may be prevented positively against wobbling. When the operating lever 10 has to be shifted to some other area in the stepped opening 12, the wedge piece 22 is pulled outwards manually a small distance. Then, the operating lever 10 is shifted to the desired area and the wedge piece 22 is released from the manual pressure. The wedge piece 22 then engages snugly with the lever 10 and the peripheral wall of the opening 12 so as to keep the lever 10 in position.

In the embodiment of the present invention, as shown in the accompanying drawings, there is provided a manually operable stop pin 23 on the upper part of the housing 1, as best shown in FIG. 5. When the worktable 2 has turned in the desired amount for the machining operation, said stop pin 23 is pulled out manually and brought into meshing with the teeth on the index gear 6 facing thereto, so as to prevent any possible backlash of the worktable 2.

It will be appreciated that the present index mechanism enables the so-called direct indexing operation to be performed easily but accurately by manipulating the lever 10 in the stepped opening 12 bored in the housing wall 11. In the embodiment of the invention as shown in the accompanying drawings, the circumference of the work may be divided into any desired number of equally spaced parts divisible by 24. The present index mechanism may however be modified for performing the indexing operations for dividing the circumference of the work into any other desired numbers of equally spaced parts. In these modified embodiments of the invention, the index gear 6 has the number of teeth equal to the maximum indexing number attainable in the indexing operation, and several dividing plates such as those shown at $9_1$, $9_2$, ..... $9_6$ have the numbers of equally spaced notches corresponding to the divisors of the above-mentioned maximum indexing number. In the same way as the foregoing embodiment, a stepped opening such as shown at 12 having the same number of stepped parts as said dividing plates is provided on the housing wall 11 so that the piece such as shown at 17 in the present embodiment may be turned for the included angles corresponding to the numbers of division to be attained in the indexing operation and then brought to a stop in contact with the operating lever positioned in the stepped parts on the opening 12.

It is also to be noted that the worktable may be set vertically to the horizontal plane, in which case the index head and the pneumatic drive mechanism as a whole may be leveled down, or turned 90° from the position shown in FIG. 1.

I claim:

1. An index head for carrying out direct indexing operations, comprising a housing, a rotatable spindle extending centrally through the inside space of said housing, a worktable carried rotatably on said spindle, an index gear fixed to the upper part of said spindle and having a number of teeth equal to the maximum number to be attained in the indexing operation, a pinion secured to the lower part of said spindle, a pneumatic drive mechanism, a pneumatic cylinder in said drive mechanism, a piston rod reciprocably mounted in said pneumatic cylinder of said pneumatic drive mechanism, a rack meshing with said pinion and formed integral with said piston rod, a member secured to said pinion and adapted for rotation therewith in the inside of said housing about said spindle, a tongue mounted on the upper part of said member, spring means for urging said tongue into pressure engagement with a tooth on said gear, a sleeve mounted on said spindle for rotation therewith and mounted for free vertical sliding motion thereon, a plurality of dividing plates secured on said sleeve, said dividing plates each having a number of equally spaced notches equal to the indexing numbers desired in the indexing operation, said plates being superposed one on the other so that the upper dividing plates have the increasing number of notches as compared with the lower ones, each of the plates having one of their notches aligned with each other and with one tooth on said index gear, a lower tongue fitted on the lower part of said member, spring means for urging said lower tongue into engaging a notch on the dividing plates, and an operating lever fitted at its inner end extremity to said sleeve for free rotation therewith, said lever protruding out of said housing at its outer end extremity, a stepped opening in said housing for permitting passage of said lever, said lever being manually movable from the outside of said housing to the desired area in the stepped opening, said member being positioned to allow said upper tongue to engage one of the aligned notches of said dividing plates when said piston rod assumes one position in said cylinder, said lever halting rotation of said member when it is actuated by said piston rod as said member abuts the operating lever, thereby regulating the angle of rotation of said member to the desired indexing angle.

2. An index head, comprising chuck, means for holding a workpiece, gear means secured for rotation with said chuck means and having teeth, rotatable means mounted coaxially with said gear means for movement relative to said gear means, drive means coupled with said rotatable means for driving said rotatable means first in one direction and then the other, ratchet means mounted on said rotatable means and biased for engaging the teeth of said gear means and causing said rotatable means to move said gear means only when said rotatable means is driven in one direction, notched structural means mounted to rotate with said gear means and having a plurality of sets of peripheral notches, each set being distributed over a different one of a plurality of peripheral paths, adjustable stop means in the path of said rotatable means and including a plurality of angularly spaced stops for defining one of a number of limits of motion for said rotatable means when said rotatable means rotates in the direction opposite to the one direction, pawl means secured to said rotatable means for engaging said structural means at one of said notches when said ratchet means moves said gear means in the one direction, said stop means cooperating with said structural means for adjusting the relative positions of said structural means and said pawl means so as to define the one of the set of notches which the pawl means engages in said structural means.

3. An index head as in claim 2, wherein said teeth on said gear means is equal in number to integral multiples of the number of notches in each of the sets of notches.

4. An index head as in claim 2, wherein said structural means defines an axis and wherein each set of notches is located at a different plane transverse to said axis.

5. An index head as in claim 2, wherein each of said set of notches includes a different number of equally distributed peripherally spaced notches.

6. An index head as in claim 4, wherein each set of notches includes a different number of equally distributed peripherally spaced notches, and wherein the number of teeth on said gear means is an integral multiple of the number of notches on each of said sets.

7. An index head as in claim 6, wherein said structural means includes a plurality of stacked coaxial disc-shaped plates each having one of the set of notches.

8. An index head as in claim 2, wherein said stop means includes a lever.

9. An index head as in claim 8, wherein said stop means further includes a wall having a stepped opening through which said lever extends.

10. An index head as in claim 4, wherein said structural means is axially slidable relative to said gear means, said stop means including a lever and a wall having a stepped opening through which said lever extends, said structural means being axially slidable, said lever being connected to said axial means to move said axial means longitudinally in dependence upon the position of said lever in said opening.

11. An index head as in claim 7, wherein said plates are axially slidable relative to said gear means, said stop means including a lever and a wall having a stepped opening through which said lever extends, said lever being connected to said plates to move said plates axially in dependence upon the position of said lever in the opening.

12. An index head as in claim 10, wherein said lever adjusts said structural means relative to said pawl means so said pawl means engages a plate in dependence upon the position of said lever.

13. An index head as in claim 12, wherein said gear means includes a spindle for mounting said plates and said gear means coaxially.

14. An index head as in claim 11, wherein said lever adjusts said plates relative to said pawl means so said pawl means engages a plate in dependence upon the position of said lever.

15. An index head as in claim 5, wherein each set has a notch aligned with a notch of the other sets.

16. An index head as in claim 14, wherein said plate means has a notch aligned with a notch of each of said other plates.

17. An index head as in claim 15, wherein said rotatable means includes a yoke coaxially rotatable with said gear means.

18. An index head as in claim 2, wherein said drive means includes a reciprocating piston.

* * * * *